United States Patent
Hinman et al.

(10) Patent No.: US 8,933,787 B2
(45) Date of Patent: Jan. 13, 2015

(54) RFID SYSTEM WITH CONFIGURABLE RF PORT

(75) Inventors: Mark P. Hinman, Holley, NY (US); Edward Zogg, Ontario, NY (US); Abhishek Sharma, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 332 days.

(21) Appl. No.: 13/532,826

(22) Filed: Jun. 26, 2012

(65) Prior Publication Data

US 2013/0342318 A1    Dec. 26, 2013

(51) Int. Cl.
*G06K 7/01*    (2006.01)

(52) U.S. Cl.
USPC .................. 340/10.1; 340/572.7; 340/10.5

(58) Field of Classification Search
CPC .................. G06K 19/07327; G06K 19/07771; G06K 19/07749; G06K 7/01; G06K 7/10178; H05K 9/0049
USPC ......... 340/10.1, 10.2, 10.3, 10.4, 10.5, 572.1, 340/572.3, 572.7
See application file for complete search history.

(56) References Cited

U.S. PATENT DOCUMENTS

| | | | |
|---|---|---|---|
| 6,725,014 B1 | 4/2004 | Voegele | |
| 7,086,587 B2 | 8/2006 | Myllymaki | |
| 7,969,286 B2 | 6/2011 | Adelbert | |
| 8,025,228 B2 | 9/2011 | Dearing et al. | |
| 8,056,817 B2 | 11/2011 | Flood | |
| 2007/0077888 A1 | 4/2007 | Forster | |
| 2007/0108296 A1 | 5/2007 | Konopka et al. | |
| 2007/0208445 A1 | 9/2007 | Gibson et al. | |
| 2009/0021343 A1 | 1/2009 | Sinha | |
| 2009/0174556 A1 | 7/2009 | Horne et al. | |
| 2009/0231138 A1 | 9/2009 | Lai et al. | |
| 2009/0302972 A1 | 12/2009 | Osamura et al. | |
| 2010/0011212 A1 | 1/2010 | Anemikos et al. | |
| 2010/0073143 A1* | 3/2010 | Schaffler | 340/10.4 |
| 2010/0102969 A1 | 4/2010 | Svalesen et al. | |
| 2010/0265302 A1 | 10/2010 | Laramie et al. | |
| 2011/0210176 A1 | 9/2011 | King | |

* cited by examiner

*Primary Examiner* — Nabil Syed
(74) *Attorney, Agent, or Firm* — Christopher J. White; Raymond L. Owens (57) ABSTRACT

An active RFID tag has an antenna inside RF-blocking enclosure having a port with a selected shortest dimension. An RFID reader located outside the enclosure at a reader position transmits a downlink RF signal through the port as a directional RF signal on a downlink carrier frequency corresponding to a downlink wavelength smaller than the selected shortest dimension. The port is selectively configured so that the directional downlink RF signal can pass through the port in an access mode during a selected access time interval and are attenuated by at least 60 dB in a restricted mode during a selected restricted time interval that does not overlap with the access time interval.

9 Claims, 5 Drawing Sheets

RFID SYSTEM WITH CONFIGURABLE RF PORT

CROSS-REFERENCE TO RELATED APPLICATIONS

This application is co-filed with and has related subject matter to U.S. patent application Ser. No. 13/532,845 filed Jun. 26, 2012, titled "RFID READING SYSTEM USING RF GRATING;" U.S. patent application Ser. No. 13/532,859 filed Jun. 26, 2012, titled "RFID SYSTEM WITH ENCLOSURE AND INTERFERENCE PATTERN;" U.S. patent application Ser. No. 13/532,874 filed Jun. 26, 2012, titled "RFID SYSTEM WITH BARRIERS AND KEY ANTENNAS;" U.S. patent application Ser. No. 13/532,831 filed Jun. 26, 2012, now U.S. Pat. No. 8,692,654, titled "RFID SYSTEM WITH MULTIPLE READER TRANSMIT FREQUENCIES;" U.S. Patent Application No. 13/532,821 filed Jun. 26, 2012, titled "RFID SYSTEM WITH MULTIPLE TAG TRANSMIT FREQUENCIES;"and U.S. patent application Ser. No. 13/532,840 filed Jun. 26, 2012, titled "READING RFID TAG USING ANTENNA WITHIN ENCLOSURE;" all of which are incorporated herein by reference.

FIELD OF THE INVENTION

This invention pertains to the field of radio-frequency communication between radio-frequency identification (RFID) tags and RFID readers, and more securing such communication.

BACKGROUND OF THE INVENTION

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), 2.4 GHz, or 5.8 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

However, RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data. This process is called "skimming," and such rogue readers are referred to as "skimmers." The skimmer can later replay the stored data (a "replay attack") to pretend to be the skimmed tag ("spoofing"). This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Horne et al. describes an RFID blocker that disrupts an RFID reader's signal to a tag when the blocker is physically near the tag. However, the blocker will disrupt all accesses, not just unauthorized access. In another scheme, U.S. Patent Publication No. 2009/0021343 by Sinha describes jamming or spoofing skimmers, either using authorized electronics or intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag. Moreover, tags affixed to objects are often used in factory or retail contexts in which a large number of tagged instances or packages (e.g., as described in U.S. Patent Publication No. 2009/0302972) carry RFID tags. This can result in contention between tags for the bandwidth, reducing the number of tags that can be read in a certain amount of time.

For example, U.S. Patent Publication No. 2010/0265302 describes RFID tags on liquid ink containers. However, this reference does not recognize difficulties that can be encountered in reading RFID tags attached to RF-attenuating containers of liquid. Moreover, containers can come in various sizes and shapes, which can require adjusting antenna directions and gains to read at a desired rate of read success. Various prior-art schemes use readers with directional antennas to reduce the area of operation in which a skimmer can detect that a read is in progress.

U.S. Patent Publication No. 2010/0102969 describes a "Faraday shield" that reduces reading of unwanted RFID objects. This shield affects the radiation pattern of the antennas to reduce their power in the direction of the unwanted objects, but does not control access to tags in the direction of wanted objects. Consequently, an unwanted rogue tag, which could be active instead of passive, and thus much higher-powered than a standard tag, could still be accessed by the reader. Moreover, the shield might increase gain in the wanted direction, making it easier for an attacker to place a rogue tag within range of the reader.

U.S. Patent Publication No. 2009/0174556 by Horne et al. describes an RFID blocker that disrupts an RFID reader's signal to a tag when the blocker is physically near the tag. However, the blocker will disrupt all accesses, not just unauthorized access. Moreover, this scheme requires the blocker and the tag be moved apart from each other to access the tag.

There is a continuing need, therefore, for a way of controlling access to RFID tags located in fixed positions, e.g., attached to containers.

U.S. Pat. No. 8,025,228 describes distribution of products in a restricted access unit near the customer. Products are equipped with RE tags. A plurality of RF tagged products is placed within a cabinet that has a door or opening that can detect access to the cabinet. One or more antennas are positioned within the door. Each antenna may have a transmission line of sight and be configured to emit a signal at predefined frequencies. Each antenna generates an electromagnetic field within the micro-warehouse. In one embodiment, the products are positioned in one or more bins, compartments, or similar devices located within the micro-warehouse such that at least two of the plurality of products are spaced a distance from each other to reduce energy sharing. The electromagnetic field is moved or altered within the micro-warehouse through the use of reflectors, devices that move the antennas, or other mechanisms. However, this scheme is not applicable to environments such as retail stockrooms in which the tagged items are not confined in a cabinet.

There is, therefore, a continuing need for ways of reading RFID tags securely, in tag-rich environments.

SUMMARY OF THE INVENTION

According to an aspect of the present invention, there is provided an RFID system, comprising:

a) an RF-blocking enclosure having a port with a selected shortest dimension, the enclosure configured so that a downlink RF signal of a selected downlink power passing through the port from a selected direction provides a received power at a selected antenna location in the enclosure;

b) an active RFID tag including a controller and an interior antenna coupled to the controller and located at the selected antenna location, the tag responsive to a selected RF downlink frequency range, wherein the received power is not less than a receive sensitivity of the active RFID tag;

c) an RFID reader located outside the enclosure at a reader position, the RFID reader adapted to transmit the downlink RF signal as a directional RF signal on a downlink carrier frequency corresponding to a downlink wavelength smaller than the selected shortest dimension, the downlink carrier frequency being within the selected RF downlink frequency range; and d) a gate adapted to selectively configure the port so that the directional RF signal transmitted by the reader in the selected direction can pass through the port in an access mode during a selected access time interval and is attenuated by at least 60 dB in a restricted mode during a selected restricted time interval that does not overlap with the access time interval.

An advantage of this invention is that it restricts RF access to the tag. Various embodiments use pseudo-random sequences or other techniques to determine when to configure the port in the access mode, so that the reader can communicate with the tag during the access time interval but skimmers cannot predict when the next access time interval will be. In various embodiments, multiple enclosures in close proximity are synchronized so they do not operate at the same time, thereby reducing RF contention and the need to repeatedly transmit the same data to achieve a successful data transfer.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

As used herein, the term "uplink" refers to communications from an RFID tag to a reader, and "downlink" to communications from a reader to a tag. These terms are used regardless of which side initiates the communication.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Figure 1:
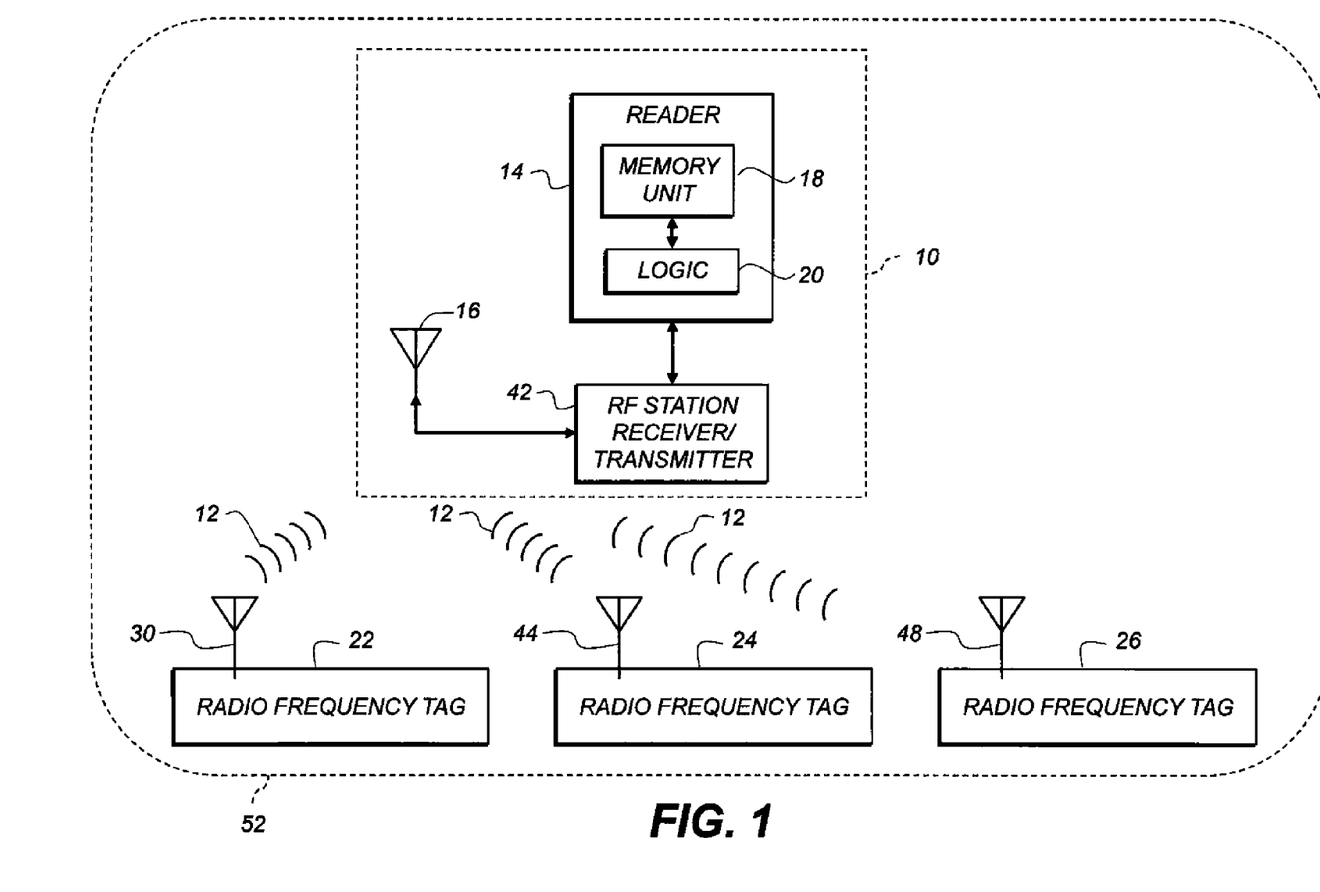
FIG. 1 is a block diagram of an RFID system according to various embodiments.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SGTINS of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52. Reader 14 and tags 22, 24, 26 can communicate using, e.g., the EPC Class-1 Generation-2 UHF RFID Protocol for Communications at 860 MHz-960 MHz, Version 1.2.0, Oct. 23, 2008, incorporated herein by reference.

Figure 2:
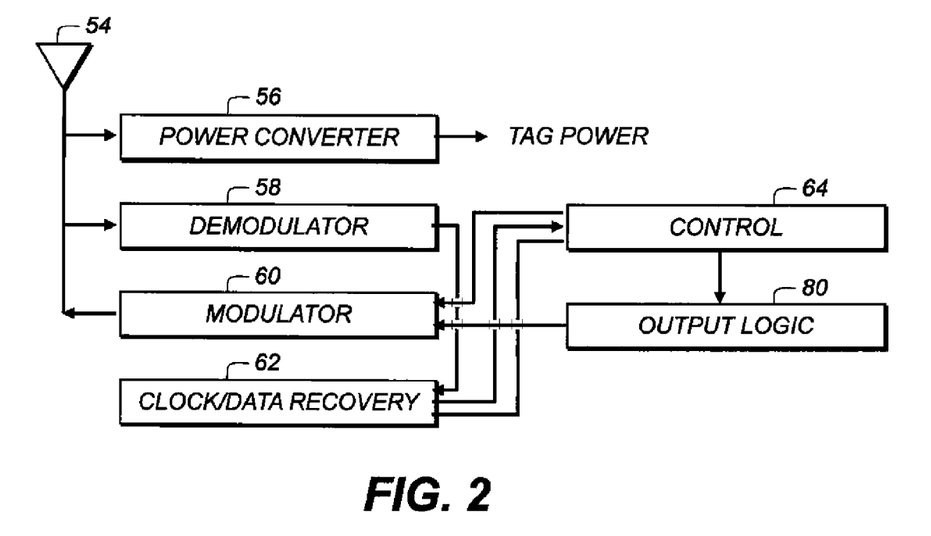
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
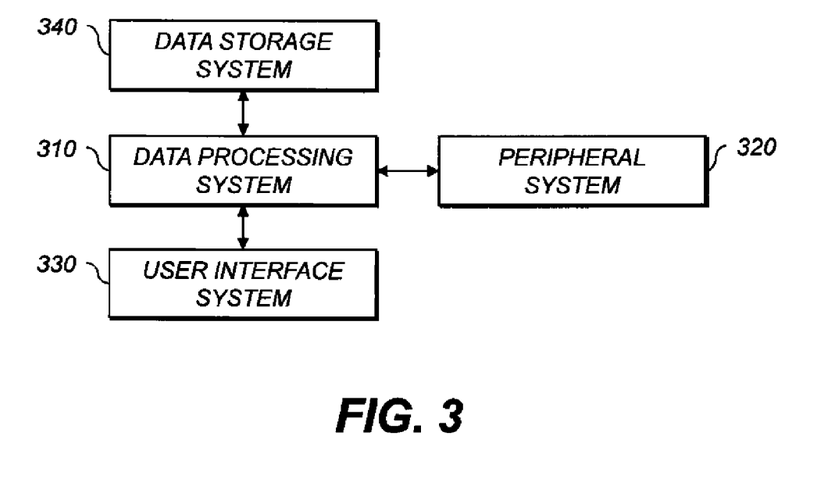
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
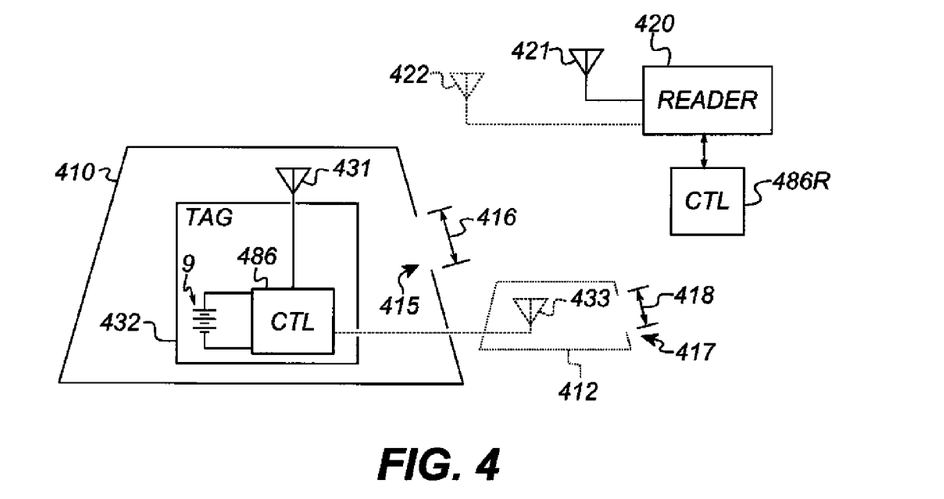
FIGS. 4 and 5 are schematics of apparatus for reading an RFID tag according to various embodiments.

FIG. 4 is a schematic of apparatus for reading RFID tag 432 using RFID reader 420 according to various embodiments. RF-blocking enclosure 410 substantially blocks RF energy at selected RFID wavelength(s) except through port 415. Port 415 can be an opening or RF-transparent window. "Blocking" means that enclosure 410 is designed (e.g., in shape or material) to attenuate incident RF energy, e.g., from a skimmer, until the energy that passes into the enclosure is below the receive sensitivity of the RFID tag, or the response from the RFID tag is below the receive sensitivity of a reader or skimmer outside the enclosure. It is not required that the enclosure be entirely RF-opaque, whether only at a frequency of interest or over a frequency band. Port 415 has (is designed with) a selected shortest dimension 416 between any two points on the periphery of port 415. This dimension affects the propagation characteristics of radio waves through port 415.

Tag 432 is an active RFID tag in enclosure 410. Enclosure 410 can include a door (not shown) that can open to permit putting tags in and taking them out of enclosure 410, or enclosure 410 can include multiple parts (e.g., a body and a lid, not shown) that can be separated to access tag 432, then put back together to reform enclosure 410. Controller 486, which can include a CPU, microcontroller, PLD, PLA, PAL, FPGA, ASIC, or other logic or software-execution device, controls the operation of tag 432. In various embodiments, tag 432 includes battery 9.

Tag 432 includes interior antenna 431 coupled to controller 486 and located in enclosure 410. Tag 432 also includes exterior antenna 433 coupled to controller 486 and located outside enclosure 410. The tag can be multiple pieces or one assembly. The RFID IC holding controller 486 can be inside or outside enclosure 410. In various embodiments, exterior antenna 433 is located in second RF-blocking enclosure 412 having port 417 with second selected shortest dimension 418. Enclosures 410, 412 can be the same size and shape or different sizes or shapes, as can ports 415, 417. Dimensions 416, 418 can be the same or different.

RFID reader 420 is located outside enclosure 410. RFID reader is controlled by controller 486R, which can include hardware described above with respect to controller 486. As used herein, references to reader 420 also refer to controller 486R in embodiments in which controller 486R is present. Reader 420 is responsive to a selected RF uplink frequency range. Reader 420 can include a single antenna 421 or multiple antennas 421, 422.

RFID tag 432 is adapted to simultaneously transmit (or backscatter) on a plurality of frequencies corresponding to respective wavelengths smaller than selected shortest dimension 416. In embodiments using enclosure 412, the wavelength transmitted from antenna 433 is smaller than dimension 418. The plurality of frequencies includes a carrier frequency and at least one interference frequency. As a result, a respective beat frequency is defined between the carrier frequency and each respective interference frequency. At least one of the beat frequencies is within the selected RF uplink frequency range. Specifically, tag 432 transmits or backscatters a first signal at a first one of the plurality of frequencies using interior antenna 431 and a second signal at a second, different one of the plurality of frequencies using exterior antenna 433. Reader 420 detects the envelope of the resulting signal, in which information is encoded. The envelope is modulated at the beat frequency. In this and other embodiments described herein, whenever two signals of different frequencies are transmitted to form a beat frequency signal at a receiver, the transmitted signals have sufficiently high coherence or coherence length to interfere and produce the beat frequency. In various embodiments, antennas 431, 433 are the coherence length of each other that is shortest, considering the carrier frequency and the interference frequencies. Reader 420 can include a low-pass filter to cut off the first and second of the plurality of frequencies, leaving only the beat frequency at the difference between the first and second of the plurality of frequencies. Reader 420 can also directly detect the first and second frequencies and compute the beat frequency using analog or digital electronic summing circuitry or logic.

Tag 432 modulates its transmissions at the plurality of frequencies so that the envelope of the resulting beat-frequency signal will correspond to the information to be transferred to reader 420. Any signal transmitted from inside enclosure 410 has a wavelength shorter than respective dimension 416. As a result, that signal propagates through port 415 substantially in a transmission mode rather than a diffraction mode. This tends to preserve directionality of the RF signals. As a result, a skimmer not in line with port 415 will see much less signal power than reader 420. If antenna 431 is a substantially isotropic emitter, the shape and size of port 415 can be selected to produce a pencil or cone of radiation propagating primarily in a given direction (e.g., subtending <45°). As described below, the Fraunhofer approximation can be used to approximately calculate the beam width of the signal through port 415 from antenna 431. In various embodiments, dimension 416 is at least ten times the wavelength of the signal from interior antenna 431. Note that throughout this disclosure, angular measurements are given in degrees. One of ordinary skill can derive corresponding steradian measurements for particular three-dimensional configurations.

Tag 432 (or, as described below, reader 420 in some embodiments) can provide a signal at the beat frequency modulated by any conventional modulation technique, e.g., frequency, phase, or amplitude modulation; continuous-wave (a special case of amplitude modulation); amplitude- or phase-shift keying; or quadrature amplitude modulation. Combinations of these can also be used.

In various embodiments, tag 432 amplitude-modulates the first frequency or the second frequency. In an example, tag 432 transmits a continuous (for the duration of transmission) carrier from external antenna 433. Internal antenna 431 is fed by a voltage-controlled oscillator that amplitude- or frequency-modulates a signal including two sidebands to prove an amplitude-modulated beat-frequency signal.

In various embodiments, tag 432 is adapted to frequency-modulate the first frequency or the second frequency. For example, to transmit CW (carrier when present, nothing when absent), the frequency of one of the signals can be modulated so that the beat frequency signal is at the uplink frequency, or much greater than the uplink frequency. Antennas and receivers generally have low-pass or band-pass filter characteristics, so moving the beat frequency signal much higher in frequency than the uplink frequency effectively results in substantially no power being present at the uplink frequency. In this way, modulating a frequency can produce CW without needing to repeatedly activate and deactivate a transmitter.

In various embodiments, the RFID tag is attached to a non-RFID-active object (not shown). The object can be a container, smart label, smart card, or product instance. The object can be an object that interferes with (e.g., attenuates or diffracts) RF energy, e.g., a metal container or a paper milk carton (the paper can pass RF but the water absorb it).

In various embodiments, antenna 433 is not used. RF-blocking enclosure 410 with port 415 having shortest dimension 416 includes tag 432 with controller 486, optional battery 9, and interior antenna 431, as discussed above. Tag 432 is responsive to RF signals in a selected RF downlink frequency (wavelength) range.

RFID reader 420 has controller 486R, antenna 421, and optional additional antenna(s) 422 located outside enclosure 410, as discussed above. Reader 420 simultaneously transmits directional RF signals on a plurality of frequencies corresponding to respective wavelengths smaller than shortest dimension 416. The plurality includes a carrier frequency and an interference frequency, so that a beat frequency is defined between the carrier frequency and the interference frequency. The beat frequency is within the selected RF downlink frequency range of tag 432. As a result, the transmitted signals higher-frequency signals pass through the port and the tag responds to the lower-frequency beat frequency signal. As discussed above, the transmitted signals have high coherence. In various embodiments, tag 432 includes a unit that detects the signals at the carrier and interference frequencies and computes the beat frequency, as defined above. In various embodiments, RFID reader 420 transmits signals at a plurality of frequencies and frequency- or amplitude-modulates one or more of the signals in the plurality.

In various embodiments, the transmitted downlink signals at their respective frequencies define a spatial beat pattern within enclosure 410. The spatial beat pattern can result from diffraction and mutual interference between the downlink signals, and can be controlled by adjusting the shape or size of enclosure 410 or port 415, or by adjusting the position of reader antenna(s) 421, 422, or the propagation patterns of signals therefrom. Interior antenna 431 is located at a peak of the spatial beat pattern, i.e., an antinode, or a point at which the power of the beat frequency is within 3 dB of the highest such power within enclosure 410.

Various embodiments of beat frequencies transmitted by either tag 432 or reader 420 advantageously provide increased security against skimmers without requiring cryptographic functions. This requires less memory and processing power, and provides reduced latency of data transmission or receipt, in a tag or reader compared to a tag or reader implementing those functions.

Figure 5:
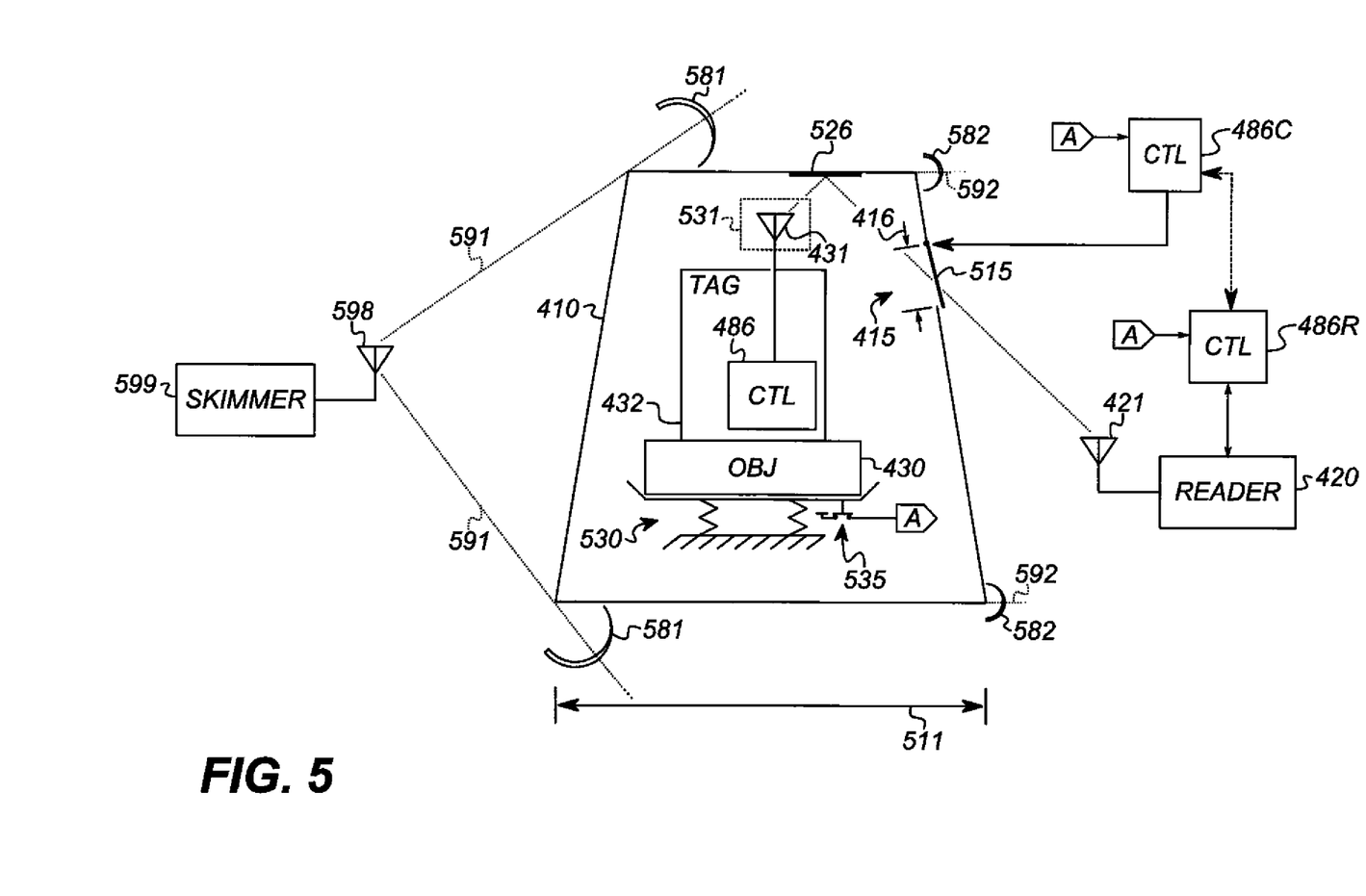

FIG. 5 is a schematic of apparatus for reading an RFID tag according to various embodiments. RF-blocking enclosure 410 has port 415 with selected shortest dimension 416 as discussed above with reference to FIG. 4. Enclosure 410 is configured so that a downlink RF signal of a selected downlink power passing through port 415 from a selected direction provides a received power at selected antenna location 531 in enclosure 410. In various embodiments, the received power is not less than a receive sensitivity of tag 432. In various embodiments, the received power is not less than −40 dB with respect to the transmitted downlink power.

Active RFID tag 432 includes controller 486 and interior antenna 431 coupled to controller 486 and located at selected antenna location 531. Tag 432 is responsive to one or more downlink RF signals at frequencies within a selected RF downlink frequency range. Tag 432 can be a single assembly including antenna 431, or a separate assembly from antenna 431, and can include one or more integrated circuits or discrete components. Controller 486 can be located inside or outside enclosure 410.

RFID reader 420 is located outside enclosure 410 at a reader position. RFID reader 420 is adapted to transmit the downlink RF signal as a directional RF signal on a downlink carrier frequency corresponding to a downlink wavelength smaller than selected shortest dimension 416. The downlink carrier frequency is within the selected RF downlink frequency range of tag 432.

Dimension 416 of port 415 is selected so that the transmission of the downlink RF signal through port 415 is substantially directional. The downlink wavelength is selected to satisfy the same requirement. In the far-field (Fraunhofer) approximation in which the distance (D) the downlink signal at the downlink wavelength travels from port 415 to antenna 431 is significantly greater than dimension 416 ($\alpha$), the angular half-width ($\theta$) of the diffraction pattern for downlink wavelength $\lambda$ is:

$$\theta \approx \sin^{-1}(\lambda/\alpha) \qquad \text{(Eq. 1)}$$

As a result, the smaller the downlink wavelength is with respect to dimension 416, the less the downlink signal will spread inside enclosure 410. For example, with $\lambda/\alpha=0.1$, $\theta \approx 5.7°$. Consequently, dimension 416 can be selected for a selected downlink wavelength so that the reader can transmit only from a specified location to reach the tag. This reduces the probability that skimmers will be able to access the tag without detection.

For example, in a factory environment, antenna 421 is located at the appropriate location to communicate with tag 432. (In general, communication is possible anywhere along the path of the dotted line extending from antenna 421.) The location of antenna 421 and reader 420 can be selected so that if skimmer hardware is installed in place of the normal hardware, that change will be visible to factory personnel.

Gate 515 selectively configures port 415 so that the directional RF signals transmitted by reader 420 in the selected direction can pass through port 415 in an access mode during a selected access time interval and are attenuated by at least 60 dB in a restricted mode during a selected restricted time interval that does not overlap with the access time interval. Gate 515 can include structures to obstruct or orient port 415, so the term "gate" is not limiting. In the example shown, gate 515 is a conductive flap that rotates up to permit signals to pass in the access mode and rotates down, sealing enclosure 410 against RF through port 415, in the restricted mode. Gate 515 or other devices can change the position of port 415, by moving port 415 in enclosure 410 similar to the way a stick-shift lever cover permits the lever to move without losing seal.

Enclosure 410 can also be moved or rotated, e.g., by a servomotor, to configure the port. Gate 515 or other devices can also change the status of port 415.

Figure 6:
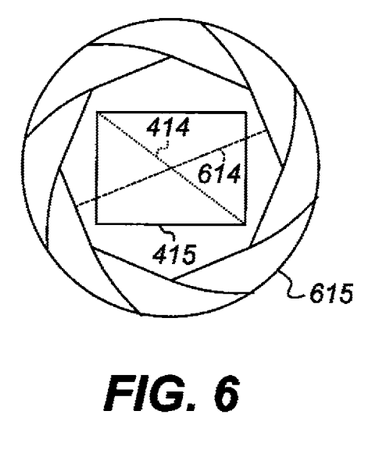
FIG. 6 shows port 415 according to various embodiments.

Gate 515 can include louvers placed over port 415; a conventional gate that swings or slides open and closed and that is made from conductive or RF-absorbing material; a conductive or RF-absorbing drawbridge; or an iris (e.g., as shown in FIG. 6), aperture, or diaphragm. Gate 515 can include one or more flaps hinged at their respective connections with the enclosure so that the RF propagation (reflection or absorption) of the signal can be controlled by opening the flaps of the gate to certain positions. In an example, gate 515 includes two flaps, one hinged to the top of port 415 and the other to the bottom, so that they can open in or out (or one in and one out) away from the center of port 415. Other structures can be used, such as a rotatable cover (not shown) over enclosure 410 that has a port corresponding to port 415. When the port of the cover is aligned with port 415, port 415 is accessible. When the port of the cover is not aligned with port 415, port 415 is restricted.

In various embodiments, enclosure 410 has at least one RF-reflecting interior surface 526. Surface 526 is positioned so that the directional downlink RF signal from reader 420 at the reader position (not shown) reflects off the interior surface before reaching the antenna location. This is represented graphically by the dotted line from reader's antenna 421 through port 415 (assuming port 415 is in the access mode), bouncing off surface 526 and reaching tag's antenna 431.

In various embodiments, controller 486C is adapted to automatically control gate 515 or other structures used to configure port 415. Controller 486C can be implemented using hardware described above for controller 486.

In various embodiments, RFID tag 432 is affixed to non-RFID-active object 430. Sensor 530 detects that object 430 is in a selected location. In the example shown, sensor 530 includes a spring-mounted tray so that when object 430 is disposed over the tray, switch 535 closes and passes a signal to controller 486C indicating object 430 is in position. Controller 486C causes gate 515 to configure port 415 in the active mode when sensor 530 detects object 430 in the selected location. In various embodiments, reader 420 is responsive to sensor 530 to transmit the downlink RF signal when sensor 530 detects object 430 in the selected location, i.e., during the active period.

In various embodiments, controller 486C changes port 415 between the access mode and the restricted mode at times determined by a pseudo-random sequence. Each bit, e.g., of a pseudo-random binary sequence, corresponds to a mode of the port (e.g., 1=access and 0=restricted) for a selected length of time. The length of time can be the same or different for each bit, and can change as the sequence progresses. The length of time can be the same for 1s as for 0s, or different. In various embodiments, the pseudo-random sequence is determined by a secret key exchange, such as a Diffie-Hellman exchange or RSA exchange, between controller 486C and reader 420. In an example, controller 486C and reader 420 are operated in a training mode in which they are electrically connected by a physical cable, over which they perform key exchange. Controller 486C and reader 420 then synchronize clocks, and each starts the sequence running. The physical cable is then disconnected. Reader 420 can reliably communicate with tag 432 when the current bit of the sequence specifies the access mode. Skimmer 599 cannot reliably communicate with tag 432 since it does not know the sequence, and its communications with tag 432 are thus interrupted in a manner unpredictable to skimmer 599.

In various embodiments, the size and shape of enclosure 410 offer increased protection against skimming. In an example, skimmer 599 has antenna 598. Rays 591 show the path of RF energy from antenna 598 past the corners of enclosure 410. The RF energy is transmitted at the downlink wavelength, which is at least ten times smallest exterior dimension 511 of enclosure 410. As a result, relatively little RF energy diffracts around the corner (crosses from the left to the right side of rays 591). This is represented graphically by indicators 581, in which thicker segments indicate directions with higher power. In an example, significant RF power can extend no more than $11.4°$ ($5.7°$ half-width times 2) off rays 591 towards the surface of enclosure 410 after rays 591 pass the corners of enclosure 410.

In various embodiments of enclosures 410 with multiple corners, RF power that does diffract around enclosure 410 is still not able to reach port 415 without diffracting around additional corners. Rays 592 show the path of diffracted energy past the right-hand corners of enclosure 410, and indicators 582 represent the reduction in RF power towards port 415. Consequently, very little RF power will reach port 415, much less diffract through port 415 in the access mode to reach tag antenna 431. In various embodiments, the interior surfaces of the enclosure are RF-absorbing or RF-attenuating. This further reduces the probability that skimmer 599 will be able to emit enough power to produce a signal that arrives at tag antenna 431 above the noise floor of demodulator 58 (FIG. 2). In an example, enclosure 410 is metallic and grounded. In another example, enclosure 410 includes a metallic or otherwise conductive inner layer tied to a specific voltage (e.g., ground).

In various embodiments, reader 420 is adapted to detect transmissions from other readers, e.g., dense-reader mode negotiations, or tag-read commands it did not issue. Reader 420 signals controller 486C when such a transmission is received. Controller 486C responds to that signal by configuring port 415 in the restricted mode. That is, access to the tag is blocked when a rogue reader makes its presence known. In various embodiments, reader 420 responds to detected transmissions from other readers by broadcasting a very-high-power RF signal to attempt to burn out the input front-ends of skimmers, rendering them inoperative. In various embodiments, before transmitting such a pulse, reader 420 signals controller 486C to operate port 415 in the restricted mode to protect tag 432 from the high power. In various embodiments, reader 420 only broadcasts the high-power signal if it detects a signal from another reader at a higher-than-standard power level. Such transmissions can be from skimmers.

FIG. 6 shows port 415 according to various embodiments. Port 415 is rectangular. Gate 515 (FIG. 5) includes iris 615 with open diameter 614 greater than long diagonal 414 of port 415.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

9 battery
10 base station
12 air interface
14 reader
16 reader's antenna
18 memory unit
20 logic unit
22, 24, 26 RFID tag
30, 44, 48 antenna
42 RF station
52 range
54 antenna
56 power converter
58 demodulator
60 modulator
62 clock/data recovery circuit
64 control unit
80 output logic
310 data-processing system
320 peripheral system
330 user-interface system
340 data-storage system
410, 412 enclosure
414 long diagonal of port 415
415 port
416 shortest dimension
417 port
418 shortest dimension
420 reader
421, 422 antenna
430 object
Parts Lists-continued
431 antenna
432 RFID tag
433 antenna
486, 486C, 486R controller
511 smallest exterior dimension
515 gate
526 RF-reflective interior surface
530 sensor
531 antenna location
535 switch
581, 582 indicator
591, 592 ray
598 skimmer's antenna
599 skimmer
614 open diameter
615 iris

The invention claimed is:

1. An RFID system, comprising:
a) an RF-blocking enclosure having a port with a selected shortest dimension, the enclosure configured so that a downlink RF signal of a selected downlink power passing through the port from a selected direction provides a received power at a selected antenna location in the enclosure;
b) an active RFID tag including a controller and an interior antenna coupled to the controller and located at the selected antenna location, the tag responsive to a selected RF downlink frequency range, wherein the received power is not less than a receive sensitivity of the active RFID tag;
c) an RFID reader located outside the enclosure at a reader position, the RFID reader adapted to transmit the downlink RF signal as a directional RF signal on a downlink carrier frequency corresponding to a downlink wavelength smaller than the selected shortest dimension, the downlink carrier frequency being within the selected RF downlink frequency range;
d) a gate adapted to selectively configure the port so that the directional RF signal transmitted by the reader in the selected direction can pass through the port in an access mode during a selected access time interval and is attenuated by at least 60dB in a restricted mode during a selected restricted time interval that does not overlap with the access time interval;
e) a controller adapted to automatically control the gate; and
f) a non-RFID-active object to which the RFID tag is affixed and a sensor for detecting that the non-RFID-active object is in a selected location, wherein the controller causes the gate to configure the port in the access mode when the sensor detects the object in the location.

2. The system according to claim 1, wherein the enclosure has at least one RF-reflecting interior surface positioned so that the directional downlink RF signal from the reader at the reader position reflects off the interior surface before reaching the selected antenna location.

3. The system according to claim 1, wherein the reader is responsive to the sensor to transmit the downlink RF signal when the sensor detects the object in the selected location.

4. The system according to claim 1, wherein the port is rectangular and the gate includes an iris with open diameter greater than the long diagonal of the port.

5. The system according to claim 1, wherein the downlink wavelength is at least ten times a smallest exterior dimension of the enclosure.

6. The system according to claim 1, wherein an interior surfaces of the enclosure is RF-absorbing or -attenuating.

7. An RFID system, comprising:
a) an RF-blocking enclosure having a port with a selected shortest dimension, the enclosure configured so that a downlink RF signal of a selected downlink power passing through the port from a selected direction provides a received power at a selected antenna location in the enclosure;
b) an active RFID tag including a controller and an interior antenna coupled to the controller and located at the selected antenna location, the tag responsive to a selected RF downlink frequency range, wherein the received power is not less than a receive sensitivity of the active RFID tag;

c) an RFID reader located outside the enclosure at a reader position, the RFID reader adapted to transmit the downlink RF signal as a directional RF signal on a downlink carrier frequency corresponding to a downlink wavelength smaller than the selected shortest dimension, the downlink carrier frequency being within the selected RF downlink frequency range;

d) a gate adapted to selectively configure the port so that the directional RF signal transmitted by the reader in the selected direction can pass through the port in an access mode during a selected access time interval and is attenuated by at least 60dB in a restricted mode during a selected restricted time interval that does not overlap with the access time interval; and a controller adapted to automatically control the gate, wherein the controller changes between the access mode and the restricted mode at times determined by a pseudorandom sequence.

8. The system according to claim 7, wherein the pseudorandom sequence is determined by a secret key exchange between the controller and the reader.

9. An RFID system, comprising:

a) an RF-blocking enclosure having a port with a selected shortest dimension, the enclosure configured so that a downlink RF signal of a selected downlink power passing through the port from a selected direction provides a received power at a selected antenna location in the enclosure;

b) an active RFID tag including a controller and an interior antenna coupled to the controller and located at the selected antenna location, the tag responsive to a selected RF downlink frequency range, wherein the received power is not less than a receive sensitivity of the active RFID tag;

c) an RFID reader located outside the enclosure at a reader position, the RFID reader adapted to transmit the downlink RF signal as a directional RF signal on a downlink carrier frequency corresponding to a downlink wavelength smaller than the selected shortest dimension, the downlink carrier frequency being within the selected RF downlink frequency range;

d) a gate adapted to selectively configure the port so that the directional RF signal transmitted by the reader in the selected direction can pass through the port in an access mode during a selected access time interval and is attenuated by at least 60dB in a restricted mode during a selected restricted time interval that does not overlap with the access time interval;

a controller adapted to automatically control the gate, wherein the reader is adapted to detect transmissions from other readers and to signal the controller, and the controller responds to the signal by configuring the port in the restricted mode.

* * * * *